United States Patent
Chen et al.

(10) Patent No.: US 8,767,003 B2
(45) Date of Patent: Jul. 1, 2014

(54) METHOD AND SYSTEM FOR OUT-OF-GAMUT SPOT COLOR REPRODUCTION

(75) Inventors: Yongda Chen, Pittsford, NY (US); Yonghui Zhao, Penfield, NY (US); James Michael Sanchez, Rochester, NY (US); Guo Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 825 days.

(21) Appl. No.: 12/564,308

(22) Filed: Sep. 22, 2009

(65) Prior Publication Data

US 2011/0069077 A1 Mar. 24, 2011

(51) Int. Cl.
*G09G 5/02* (2006.01)

(52) U.S. Cl.
USPC .......................................... 345/590

(58) Field of Classification Search
None
See application file for complete search history.

(56) References Cited

U.S. PATENT DOCUMENTS

| | | | | |
|---|---|---|---|---|
| H1506 H | * | 12/1995 | Beretta ......................... | 345/591 |
| 6,269,184 B1 | * | 7/2001 | Spaulding et al. ............ | 382/167 |
| 7,327,384 B2 | * | 2/2008 | Ivers ............................. | 348/184 |
| 2006/0158669 A1 | * | 7/2006 | Haikin et al. .................. | 358/1.9 |
| 2007/0229864 A1 | * | 10/2007 | Sasaki ............................ | 358/1.9 |
| 2008/0043263 A1 | | 2/2008 | Hancock et al. | |
| 2008/0043271 A1 | | 2/2008 | Gil et al. | |

OTHER PUBLICATIONS

ProfileMaker White Paper, available online at http://www.coloraccuracy.com/files/CCCW200000%5C334.pdf since Dec. 2004.*
Fenton "Digital front Ends for Digital Presses" available online at http://web.archive.org/web/20080531080839/http://in3.org/fenton/DFEs.htm, May 31 2008.*
"Fix Out-of-Gamut Images—Hue and Saturation", class notes available at http://web.archive.org/web/20061231080727/http://www.udel.edu/cookbook/class/Tricks/fixgamut-huesat.pdf, herein after referred as FixGamut since Dec. 2006.*

* cited by examiner

*Primary Examiner* — Xiao Wu
*Assistant Examiner* — Yingchun He
(74) *Attorney, Agent, or Firm* — Kermit D. Lopez; Luis M. Ortiz; Ortiz & Lopez, PLLC

(57) ABSTRACT

A gamut mapping method and system for implementing out-of-gamut spot color reproduction, including a memory for electronically storing information related to at least one color gamut and a gamut mapping editor including a processor communicating with the memory, the processor of the gamut mapping editor (i) causing a user to be apprised that a target spot color is outside the at least one color gamut and (ii) facilitating the user's employment of one or more of a plurality of gamut mapping methodologies to select a preferred color from a plurality of mapped colors when the target spot color is outside the at least one color gamut.

19 Claims, 2 Drawing Sheets

METHOD AND SYSTEM FOR OUT-OF-GAMUT SPOT COLOR REPRODUCTION

BACKGROUND

1. Field of the Related Art

The present disclosure relates to a method and system for color management in image/text printing or display systems, and more particularly, to a method and system for achieving out-of-gamut spot color reproduction through use of a gamut mapping editor.

2. Background of the Related Art

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements.

Since imaging can occur over a variety of different printing systems and practiced by a variety of different clients and customers, the colors may not always be consistent or accurate. Existing spot color editors utilize a manual approach to the adjustment of CMYK (cyan, magenta, yellow, black) recipes of spot colors prior to raster image processing (Wing). For example, a document creator may select a Pantone® color for application in specific areas through a user interface on a printing device or computer monitor, such as that available on a Xerox® DocuSP® Controller. The Pantone® provided CMYK recipe for the selected printer is obtained from a look-up table. Prior to RIPing the document in the printer, the operator has the option of entering a spot color editor function and specifying an alternative CMYK recipe to achieve the desired color. The document is then RIPed and printed using the spot color editor recipes where specified, and Pantone® recipes otherwise.

Thus, spot color reproduction is a desirable property in the printing industry. There are different methods to reproduce accurate spot colors on a printer system, such as ICC (international color consortium) profile, iterating printer model, or directly iterating on a printer. However, regardless of what methods are used, only in-gamut spot colors may be reproduced accurately. For out-of-gamut spot colors, some gamut mapping methods have to be applied to map these colors onto a gamut surface. In such a case, a noticeable color difference between the target spot color and the final reproduction cannot be avoided.

Currently, most DFE (digital front end) servers do not inform customers whether the target spot colors are in-gamut or out-of-gamut. Thus, when customers observe color differences between reproduced and target spot colors, they are unaware of whether the difference is mainly caused by inaccurate spot color rendering or by the gamut mapping for this unachievable out-of-gamut target color. For the latter case, it may take customers plenty of time and resources to adjust CMYK recipes for the better matching of these unachievable out-of-gamut spot colors.

There are several gamut mapping methods that exist. For example, an out-of-gamut spot color can be mapped to various colors on the gamut surface based on different gamut mapping methods. Some methods reserve both hue and lightness, but sacrifice chroma, some methods reserve hue, but compromise lightness and chroma, and some gamut mapping methods attempt to locate the nearest point on the gamut surface in the CIELAB space or to minimize a color difference between the mapped and target colors under a specific color difference formula. One specific gamut mapping method may be suitable for some out-of-gamut spot colors, but not for others. For example, the DeltaE2000 gamut mapping method minimizes the color difference using a DeltaE2000 color difference formula, but it does not reserve hue values. This method can be used for the out-of-gamut spot colors near the gamut boundary. However, if it is applied to a spot color far from the gamut boundary, it may map the spot color to a color that has a quite different hue from the target color, and causes large visual color difference and unacceptable results. Another issue for using a fixed gamut mapping method for spot color reproduction is that several spot colors would be mapped to the same point on the gamut surface. That would cause these spot colors to be undistinguishable on prints.

Currently, most DFE servers provide one fixed gamut mapping method for all spot colors. Although this method is carefully selected to be suitable for most spot colors, it cannot satisfy all spot colors and the customer's requirements for highly accurate spot color reproduction. One method to apply various gamut mapping methods for spot colors is to use different ICC profiles for different spot colors. But this method still presents undesirable results. For example, if two spot colors are in the same page, only one ICC profile can be applied to these two spot colors.

SUMMARY

The present disclosure is intended to overcome the drawbacks of other methods and systems by providing for a gamut mapping method and system for implementing out-of-gamut spot color reproduction by allowing a user to select a preferred color from a plurality of mapped colors by using one or more desired methodologies.

The present disclosure provides a gamut mapping system for implementing out-of-gamut spot color reproduction, including a memory for electronically storing information related to at least one color gamut and a gamut mapping editor including a processor communicating with the memory, the processor of the gamut mapping editor (i) causing a user to be apprised that a target spot color is outside the at least one color gamut and (ii) facilitating the user's employment of one or more of a plurality of gamut mapping methodologies to select a preferred color from a plurality of mapped colors when the target spot color is outside the at least one color gamut.

The present disclosure also provides a gamut mapping method for implementing out-of-gamut spot color reproduction, including electronically storing information related to at least one color gamut and using a gamut mapping editor, including a processor, to (i) apprise a user as to when a target spot color is outside the at least one color gamut and (ii) assist the user in using one or more of a plurality of gamut mapping methodologies to select a preferred color from a plurality of mapped colors when the target spot color is outside the at least one color gamut.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
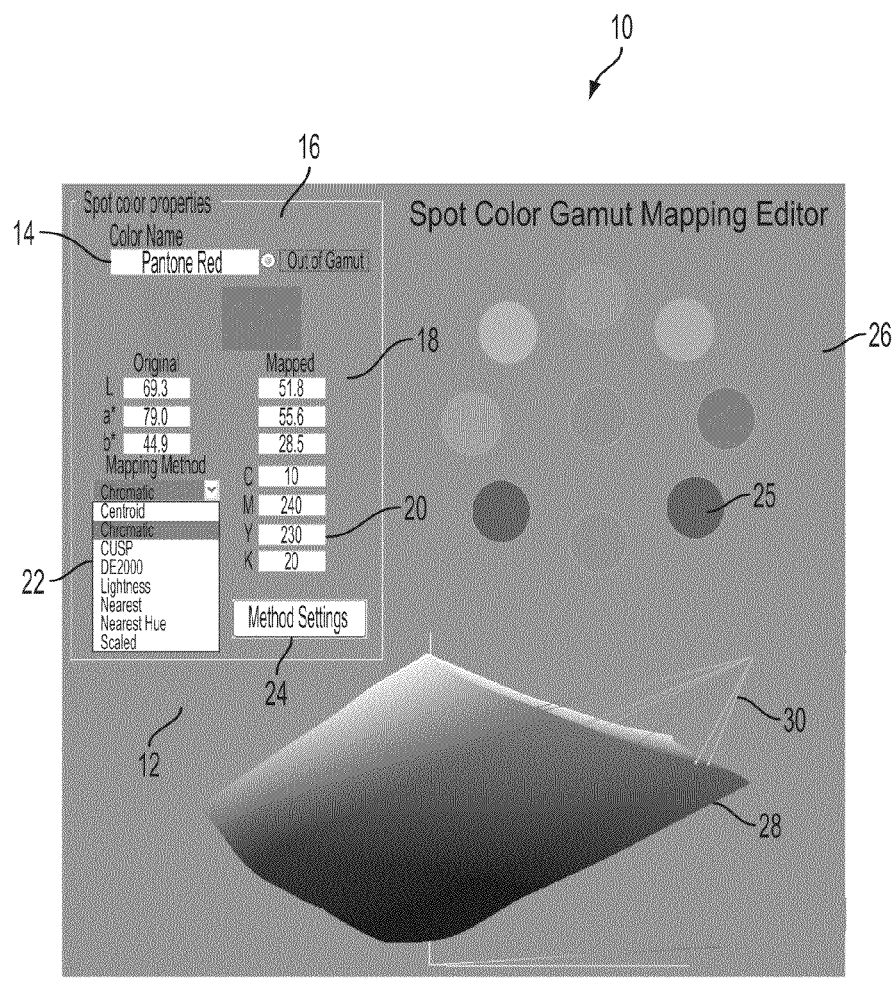
FIG. 1 is a schematic of a graphical user interface (GUI) illustrating a gamut mapping editor for out-of-gamut spot color reproduction, in accordance with the present disclosure.

In the following detailed description, reference is made to the accompanying drawings, which form a part hereof, and in which is shown by way of illustration specific illustrative embodiments in which the present disclosure may be practiced. These embodiments are described in sufficient detail to enable those skilled in the art to practice the present disclosure, and it is to be understood that other embodiments may be utilized and that logical, mechanical and electrical changes may be made without departing from the scope of the disclosure. The following detailed description is, therefore, not to be taken in a limiting sense.

The present disclosure proposes a customer-friendly application for out-of-gamut spot color reproduction. In the exemplary embodiments of the present disclosure, a gamut mapping editor is incorporated into a DFE (digital front end) server and operates in a computing environment or in one or more networks via, for example, a plurality of processors. The gamut mapping editor informs the customer whether the selected spot color is in gamut or not and allows the customer to select the preference color among several colors mapped with different gamut mapping methods if the selected spot color is out-of-gamut. This gamut mapping editor is a customer-friendly GUI (graphical user interface) incorporated in the DFE server, the server in operable communication with or associated with one or more processing machines.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

As used herein, "print job" is not limited to a particular electronic format, such a bitmap, but can include any suitable format including PDF, word processor formats, rich text (RTF), etc., as will be appreciated by those skilled in the art.

The term "image," as used in this disclosure refers to a graphic or plurality of graphics, compilation of text, a contone or halftone pictorial image, or any combination or sub-combination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images."

The term "image data source" may refer to a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source may include a plurality of components including displays, user interfaces, memory, disk drives, and the like. For simplicity of the following disclosure, it is assumed that the image data source is a personal computer although, as indicated above, the image data source is not limited to a personal computer. However, an image data source may also incorporate or be incorporated within a MFD. An image data source may be in cooperation with any type of network or computing environment that includes one or more processors or machines.

Various computing environments may incorporate capabilities for supporting a network on which the spot color gamut mapping editor may reside. The following discussion is intended to provide a brief, general description of suitable computing environments in which the method and system may be implemented. Although not required, the method and system are described in the general context of computer-executable instructions, such as program modules, being executed by a single computer, an MFD, a server, or a plurality of processors for running the gamut mapping editor and the gamut mapping engine. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, mufti-processor systems, microprocessor-based or programmable consumer electronics, networked PCs, minicomputers, mainframe computers, MFDs, and the like. The method and system may also be practiced in distributed computing environments where tasks are performed by remote processing devices that are linked through a communication network. In a distributed computing environment, program modules may be located in both local and remote memory storage devices.

Additionally, "code" as used herein, or "program" as used herein, is any plurality of binary values or any executable, interpreted or compiled code which can be used by a computer or execution device to perform a task. This code or program can be written in any one of several known computer languages. A "computer," as used herein, can mean any device which stores, processes, routes, manipulates, or performs like operation on data. A "computer" may be incorporated within one or more MFDs or servers to operate one or more processors to run the gamut mapping editor and the gamut mapping engine. It is to be understood, therefore, that this disclosure is not limited to the particular forms illustrated and that it is intended in the appended claims to embrace all alternatives, modifications, and variations which do not depart from the spirit and scope of the embodiments described herein.

Embodiments will be described below while referencing the accompanying figures. The accompanying figures are merely examples and are not intended to limit the scope of the present disclosure.

With reference to FIG. 1, there is presented a graphical user interface (GUI) illustrating a gamut mapping editor for out-of-gamut spot color reproduction, in accordance with the present disclosure.

The gamut-mapping editor GUI 10 includes a top-left panel 12. The top-left panel 12 includes a spot color name text editor 14, a radio button 16, six text editors 18 that indicate the target and mapped CIELAB values, four text editors 20 that indicate the CMYK recipes, a pop-up menu 22, and a "Method Settings" button 24. Additionally, a top-right panel 26 includes the target spot color circled with its mapped colors along with different gamut mapping algorithms and a graph 28 that illustrates the target spot color and its mapped colors on the gamut surface based on different gamut mapping algorithms along with the print gamut with an arrow ray 30 representing the selected gamut mapping method.

A gamut mapping engine may include a printer gamut object and a plurality of gamut mapping algorithms. The gamut mapping engine provides customers/users with different mapped colors based on various gamut mapping algorithms for out-of-gamut spot colors, such as hue-reserve, lightness-reserve, chroma-reserve, etc. The target and mapped colors are defined in the CIELAB space. In order to illustrate these colors on a GUI 10, these CIELAB values are converted to sRGB (standard red green blue) space for display purposes. Users may simply choose the mapped color based on their preference for this spot color.

The GUI 10 is designed to inform customers whether a desired spot color is out-of-gamut or not, and if out-of-gamut, it allows customers/users to choose the preferred color among various mapped colors based on a plurality of gamut mapping algorithms. The GUI 10 can also illustrate this target spot color and its mapped colors on the gamut surface along with the print color gamut. An example of GUI 10 is shown in FIG. 1 for illustrating the functionality of the gamut-mapping editor. The GUI 10 may be incorporated on a computer or an MFD or any type of image data source.

FIG. 1 shows one example of gamut-mapping editor GUI 10 for spot color reproduction. The top-left panel 12 includes a text editor indicting the spot color name 14, a radio button 16 indicating in-gamut (not selected) or out-of-gamut (selected) by the editor, six text editors 18 that indicate the target and mapped CIELAB values for the selected gamut mapping algorithm, and four text editors 20 that indicate the CMYK recipes for the selected gamut mapping algorithm.

A pop-up menu 22 lists all of selectable gamut mapping methods and as one of them is chosen (or a plurality of them are chosen), the corresponding mapped CIELAB values and CMYK recipes would be shown in text boxes. For high-end customers, they can tune the parameters or settings for each gamut mapping algorithm by clicking "Method Settings" button 24.

The top-right panel 26 illustrates the target spot color and circled with its mapped colors along with different gamut mapping algorithms. Customers/users may directly click on the circle mapped color patch 25 to choose one or more gamut mapping methods they prefer. The mapped CIELAB and CMYK recipes should be shown in the top-left panel 12. The bottom panel includes a graph 28 that illustrates the target spot color and its mapped colors on the gamut surface based on different gamut mapping algorithms along with the print gamut. The arrow ray 30 representing the selected gamut mapping method is illustrated with normal color and with contrast colors. In the exemplary embodiments of the present disclosure, an out-of-gamut spot color "Pantone® Red" may be used to show the functionality of gamut-mapping editor GUI 10.

It is noted that the gamut mapping engine and the gamut mapping editor are associated with, or in operable communication with, one or more processors or servers or computers or machines or MFDs or image data sources to implement the out-of-gamut spot color reproduction methods and systems of the present disclosure. The gamut mapping engine and the gamut mapping editor may be executed in any type of computing environment running on any types of network.

Figure 2:
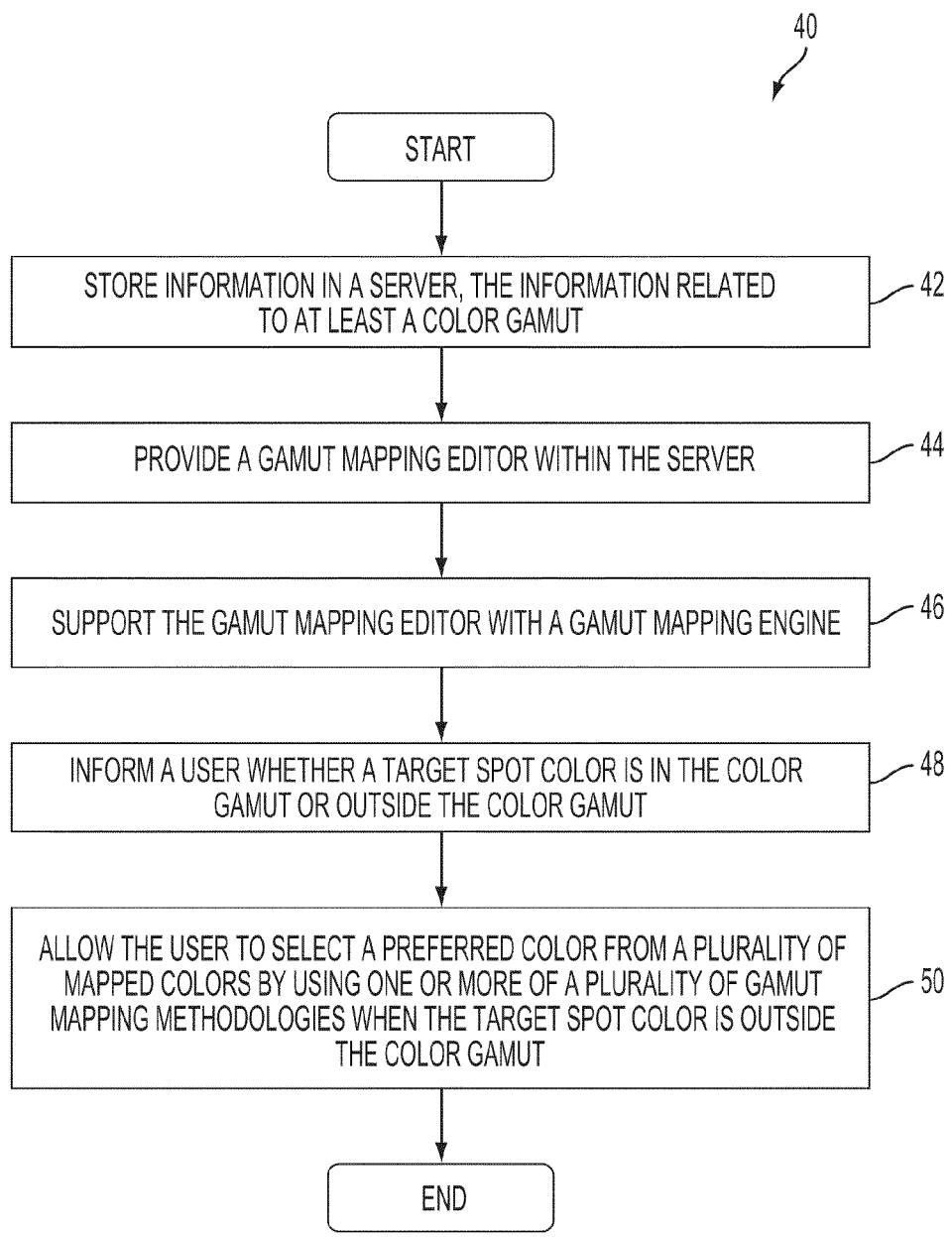
FIG. 2 is a flowchart illustrating a process manipulating a gamut mapping editor for out-of-gamut spot color reproduction, in accordance with the present disclosure.

With reference to FIG. 2, there is presented a flowchart illustrating a process manipulating a gamut mapping editor for out-of-gamut spot color reproduction, in accordance with the present disclosure.

The flowchart 40 includes the following steps. In step 42, information is stored in a server, where the information is related to at least a color gamut. In step 44, a gamut mapping editor is provided within the server. In step 46, the gamut mapping editor is supported with a gamut mapping engine. In step 48, a user is informed whether a target spot color is in the color gamut or outside the color gamut. In step 50, the user is allowed to select a preferred color from a plurality of mapped colors by using one or more of a plurality of gamut mapping methodologies when the target spot color is outside the color gamut. The process then ends.

It is to be understood that certain aspects of the gamut mapping system would operate in accordance with pre-programmed instructions used to operate a local or networked computer system to carry out such features, perhaps on a plurality of interconnected computers or MFDs at a time. Such a system might include a commercially available personal computer (PC) or MFD or image data source with appropriate graphics rendering capabilities that can also be associated with a networked storage medium or similar memory device wherein the system is accessible, perhaps via an Internet or intranet for submission of print jobs.

The present disclosure proposes an alternative method that takes advantage of mapping out-of-gamut spot colors for spot color reproduction. The approaches described above provide any service provider with several methods for mapping out-of-gamut spot colors. Furthermore, the concept of mapping out-of-gamut spot colors received from a plurality of MFDs or image data sources is a general concept in that it can be used for any type of applications contemplated by one skilled in the art. For example, any service provider could provide/control/own/sell the MFDs or image data sources. In addition, service providers could use any type of printer and/or MFD and/or electronic device to achieve the desired results of the present disclosure.

A service provider can be any entity that develops, offers, controls, manages, owns, alters and/or sells software and/or hardware products. A service provider can be any entity that performs one or more tasks on one or more pre-existing MFDs or image data sources, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

In conclusion, the exemplary embodiments of the present disclosure propose a gamut mapping editor for out-of-gamut color reproduction services. The present disclosure presents a method and system of creating a complete spot color edit function for current printing systems, which includes the editing for out-of-gamut spot colors. Such gamut mapping editor saves customers' time and effort to match an out-of-gamut spot color and also provides possibilities/opportunities/strategies for customers to choose different gamut mapping strategies based on the color properties of printer system used and their own preference to reproduce an out-of-gamut spot color.

The advantages and/or benefits of the present disclosure include at least: (1) a user friendly gamut mapping editor, (2) a user selectable gamut mapping method per out-of-gamut spot color, (3) fine tuning one or more parameters to best match a user's preference regarding desired colors, and (4) a data mining system that gathers the user preferred gamut mapping method for each spot color.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A gamut mapping system for implementing out-of-gamut spot color reproduction, the system comprising:
a memory for electronically storing information related to at least one color gamut;
a gamut mapping editor incorporated in a digital front end including a processor communicating with the memory, the processor of the gamut mapping editor (i) causing a user to be apprised that a target spot color is outside the at least one color gamut and (ii) facilitating the user's employment of one or more of a plurality of gamut mapping methodologies, by listing said plurality of gamut mapping methodologies, to select a preferred color from a plurality of mapped colors when the target spot color is outside the at least one color gamut;
wherein said plurality of mapped colors is defined in a uniformed color space;
wherein said plurality of mapped colors is represented on a graphical user interface (GUI) by converting CIELAB values to display color space; and
wherein the GUI displays the target spot color and the mapped colors visually and in association with a visual printer gamut object comprising a graph illustrating the target spot color, the plurality of mapped colors on a surface of the gamut object, and an arrow ray indicating a selected gamut mapping methodology.

2. The system of claim 1, wherein the gamut mapping editor provides the user with the plurality of mapped colors based on a plurality of gamut mapping algorithms for out-of-gamut spot colors.

3. The system of claim 2, wherein the user is permitted to tune one or more parameters and settings related to a plurality of gamut mapping algorithms for out-of-gamut spot colors.

4. The system of claim 1, wherein the user is permitted to tune one or more parameters and settings related to a plurality of gamut mapping algorithms for out-of-gamut spot colors.

5. The system of claim 1 wherein the gamut mapping editor provides the user with the plurality of mapped colors based on a plurality of gamut mapping algorithms for out-of-gamut spot colors and wherein the user is permitted to tune one or more parameters and settings related to a plurality of gamut mapping algorithms for out-of-gamut spot colors.

6. The system of claim 5, in which the system corresponds with a printer gamut, further comprising: a display monitor corresponding with a monitor gamut, wherein the monitor gamut is greater than the printer gamut.

7. The system of claim 1, in which the system corresponds with a printer gamut, further comprising:
a display monitor corresponding with a monitor gamut, wherein the monitor gamut is greater than the printer gamut.

8. A method for implementing out-of-gamut spot color reproduction, the method comprising:
electronically storing information related to at least one color gamut;
using a gamut mapping editor incorporated in a digital front end, including a processor, to (i) apprise a user as to when a target spot color is outside the at least one color gamut and (ii) assist the user in using one or more of a plurality of gamut mapping methodologies, by listing said plurality of gamut mapping methodologies, to select a preferred color from a plurality of mapped colors when the target spot color is outside the at least one color gamut;

wherein the plurality of mapped colors is defined in a uniformed color space;

wherein the plurality of mapped colors is represented on a graphical user interface (GUI) by converting CIELAB values to display color space; and wherein the GUI displays the target spot color and the mapped colors visually and in association with visual printer gamut object comprising a graph illustrating the target spot color, the plurality of mapped colors on a surface of the gamut object, and an arrow ray indicating a selected gamut mapping methodology.

9. The method of claim 8, wherein the gamut mapping editor provides the user with the plurality of mapped colors based on a plurality of gamut mapping algorithms for out-of-gamut spot colors.

10. The method of claim 8, wherein the user is permitted to tune one or more parameters and settings related to a plurality of gamut mapping algorithms for out-of-gamut spot colors.

11. The method of claim 10 wherein the gamut mapping editor provides the user with the plurality of mapped colors based on a plurality of gamut mapping algorithms for out-of-gamut spot colors.

12. The method of claim 8 wherein:

the gamut mapping editor provides the user with the plurality of mapped colors based on a plurality of gamut mapping algorithms for out-of-gamut spot colors; and the user is permitted to tune one or more parameters and settings related to a plurality of gamut mapping algorithms for out-of-gamut spot colors.

13. The method of claim 8, in which the system corresponds with a printer gamut, further comprising:

a display monitor corresponding with a monitor gamut, wherein the monitor gamut is greater than the printer gamut.

14. A system for implementing out-of-gamut spot color reproduction, the system comprising:

a computing device;

a computer-readable storage medium in communication with the computing device, the computer-readable storage medium comprising one or more programming instructions for:

electronically storing information related to at least one color gamut;

using a gamut mapping editor incorporated in a digital front end, including a processor, to (i) apprise a user as to when a target spot color is outside the at least one color gamut and (ii) assist the user in using one or more of a plurality of gamut mapping methodologies, by listing said plurality of gamut mapping methodologies, to select a preferred color from a plurality of mapped colors when the target spot color is outside the at least one color gamut;

wherein the plurality of mapped colors is defined in a uniformed color space;

wherein the plurality of mapped colors is represented on a graphical user interface (GUI) by converting CIELAB values to display color space;

wherein the GUI displays the target soot color and the mapped colors visually and in association with a visual printer gamut object comprising a graph illustrating the target spot color, the plurality of mapped colors on a surface of the gamut object, and an arrow ray indicating a selected gamut mapping methodology.

15. The system of claim 14, wherein the gamut mapping editor provides the user with the plurality of mapped colors based on a plurality of gamut mapping algorithms for out-of-gamut spot colors.

16. The system of claim 15, in which the system corresponds with a printer gamut, further comprising: a display monitor corresponding with a monitor gamut, wherein the monitor gamut is greater than the printer gamut.

17. The system of claim 14, wherein the user is permitted to tune one of more parameters and settings related to a plurality of gamut mapping algorithms for out-of-gamut spot colors.

18. The system of claim 17, wherein the gamut mapping editor provides the user with the plurality of mapped colors based on a plurality of gamut mapping algorithms for out-of-gamut spot colors.

19. The system according to claim 14, in which the system corresponds with a printer gamut, further comprising:

a display monitor corresponding with a monitor gamut, wherein the monitor gamut is greater than the printer gamut.

* * * * *